US007181175B2

(12) United States Patent
Nimmo-Smith et al.

(10) Patent No.: US 7,181,175 B2
(45) Date of Patent: Feb. 20, 2007

(54) TRANSMIT NETWORK FOR A CELLULAR BASE-STATION

(75) Inventors: Norman Richard Nimmo-Smith, Worcs (GB); Louis David Thomas, Worcs (GB); Geoffrey Raymond Bradbeer, Worcs (GB); John Allerton Spicer, Worcs (GB); Stephen Bullers, Worcs (GB)

(73) Assignee: Quintel Technology Limited, Farnborough (GB)

( * ) Notice: Subject to any disclaimer, the term of this patent is extended or adjusted under 35 U.S.C. 154(b) by 418 days.

(21) Appl. No.: 10/473,883

(22) PCT Filed: Mar. 22, 2002

(86) PCT No.: PCT/GB02/01401

§ 371 (c)(1),
(2), (4) Date: Oct. 3, 2003

(87) PCT Pub. No.: WO02/082581

PCT Pub. Date: Oct. 17, 2002

(65) Prior Publication Data

US 2004/0137947 A1 Jul. 15, 2004

(30) Foreign Application Priority Data

Apr. 4, 2001 (GB) .................. 0108456.5

(51) Int. Cl.
*H03C 7/02* (2006.01)
*H04B 1/02* (2006.01)
*H04B 7/02* (2006.01)

(52) U.S. Cl. .................. 455/101; 455/103; 455/121; 455/561

(58) Field of Classification Search ............... 455/101, 455/103, 121, 561, 562.1
See application file for complete search history.

(56) References Cited

U.S. PATENT DOCUMENTS 4,211,894 A * 7/1980 Watanabe et al. ........... 370/339

(Continued)

FOREIGN PATENT DOCUMENTS

EP 0380914 A2 * 8/1989

(Continued)

OTHER PUBLICATIONS

S. Smith, "Site Sharing for Cost Minimisation" www.twsinternational.com/papers/Nov98SiteSharing.pdf, Nov. 1998, pp. 1-7.

(Continued)

*Primary Examiner*—Matthew D. Anderson
*Assistant Examiner*—Tuan Pham
(74) *Attorney, Agent, or Firm*—Nixon & Vanderhye P.C.

(57) ABSTRACT

A transmit network for cellular mobile radio networks incorporates tow transmit multiplexers (122ABE) and (122CD): the first transmit multiplexer 122ABE receives a group of output signals from three transmitters (124A, 124B and 124E), and filters them in respective band-pass filters (126A, 126B and 126E); the second transmit multiplexer (122CD) receives a group of output signals from two further transmitters (124C and 124D), and filters them in respective band-pass filters (126C and 126D). The transmit frequencies in each signal group are non-adjacent, which improves isolation between transmitters provided by the filters (126). Filtered output signals from respective band-pass filters (126) are combined at filter outputs (128X and 128Y) from which signals are combined in a combiner (132) providing a degree of isolation between these outputs and enabling the signals to be combined with minimal distortion. Signals from the combiner (132) are fed via a duplexer to a transmit/receive antenna.

8 Claims, 13 Drawing Sheets

U.S. PATENT DOCUMENTS

| | | | |
|---|---|---|---|
| 4,641,365 A * | 2/1987 | Montini, Jr. | 455/78 |
| 5,212,815 A * | 5/1993 | Schumacher | 455/126 |
| 5,229,729 A | 7/1993 | Toshio et al. | |
| 5,408,690 A * | 4/1995 | Ishikawa et al. | 455/115.4 |
| 5,499,033 A * | 3/1996 | Smith | 343/700 MS |
| 5,584,058 A | 12/1996 | Pitt | |
| 6,085,094 A * | 7/2000 | Vasudevan et al. | 455/447 |
| 2001/0012788 A1 * | 8/2001 | Gammon | 455/562 |

FOREIGN PATENT DOCUMENTS

| | | |
|---|---|---|
| EP | 0 566 603 | 6/1996 |
| GB | 2006579 A | 5/1979 |
| WO | 92/12579 A | 7/1992 |
| WO | 97/44914 A | 11/1997 |

OTHER PUBLICATIONS

B.L. Wixon, "Tunable CDMA Combiners Add Cellular/PCS Capacity" www.klmicrowave.com.news/mrf_sept97.html, Sep. 1997.

Sinclair Technologies Inc., "Suggested VHF/UHF Trunking Configurations Reference Guide" www.sinctech.com, Oct. 2001.

* cited by examiner

Fig.3.
Prior Art
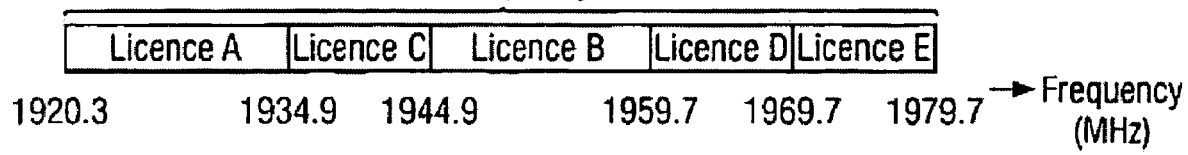
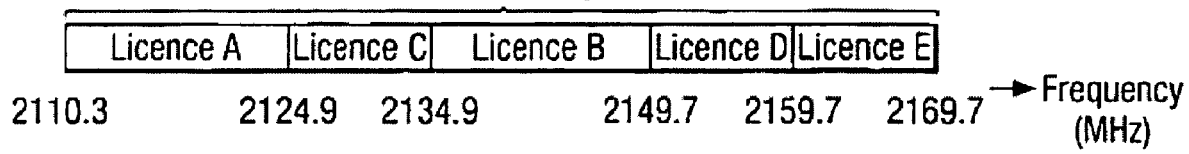
Fig.4.
Prior Art
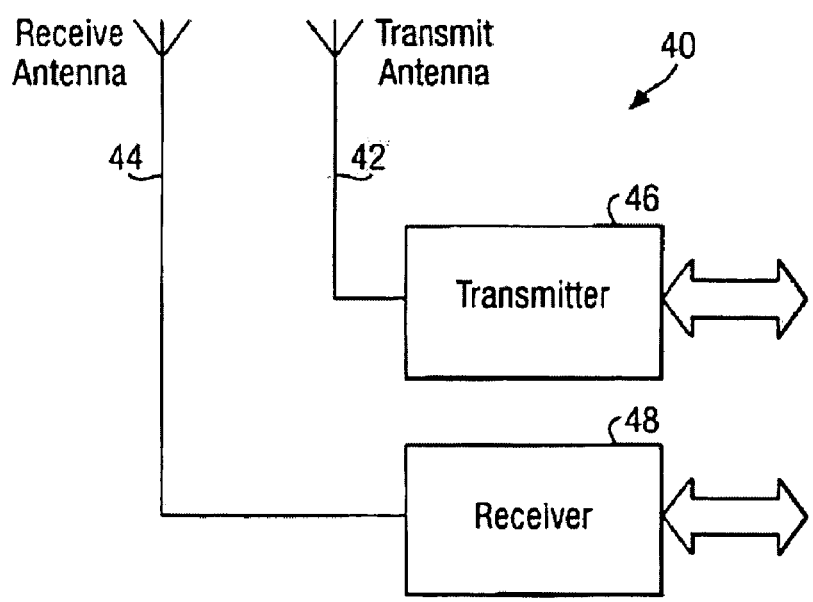

▨ Unused Carrier Frequency

▨ Unused Carrier Frequency

TRANSMIT NETWORK FOR A CELLULAR BASE-STATION

This application is the US national phase of international application PCT/GB02/01401 filed 22 Mar. 2002, which designated the US. PCT/GB02/01401 claims priority to GB Application No. 0108456.5 filed 4 Apr. 2001. The entire contents of these applications are incorporated herein by reference.

This invention relates to a transmit network for a cellular base-station, and more particularly to a transmit network of the kind usable in cellular mobile radio networks referred to familiarly as mobile telephone networks.

Operators of cellular mobile radio networks employ their own base-stations with associated mast and antennas. There is little sharing of base-station sites, and any sharing that does take place is limited to sharing of the mast only.

The currently planned introduction of the third generation cellular mobile radio system will demand an increased number of base-station sites and bring difficulties in acquiring the necessary locations: this will make site sharing an increasingly attractive option for network operators together with associated benefits of equipment cost sharing.

In a cellular mobile radio network, antennas define the desired coverage area, which is divided into a number of overlapping cells each associated with a respective antenna and base-station. Each cell contains a fixed base-station which maintains radio communication with all mobile radios in that cell. The base-stations themselves are interconnected by some other form of fixed communications, usually in some kind of meshed structure. This enables mobile radios throughout the cellular coverage area to communicate with one another and also with the public telephone system outside the cellular network.

The respective antenna associated with each cell and base-station provides radio coverage within the cell: it might be a composite device incorporating a number of individual antenna elements, each providing coverage over a limited part of the cell.

Although sharing base-station locations and facilities is desirable, there are unfortunately difficulties associated with it. In the United Kingdom, respective transmit/receive frequency bands are allocated to five operators for transmissions between mobile radios and base-stations. The resulting five transmit bands are contiguous and so are the five receive bands: i.e. there are no gaps between adjacent bands allocated to different operators.

One common prior art base-station architecture uses separate receive and transmit antennas; alternatively a single antenna can be used to transmit and receive if connected to the base-station through a duplexer. These two alternatives are adequate when each network operator has a separate base-station site, but it creates difficulties when operators share a site. A common approach to sharing a base-station site involves operators having individual antennas. If five operators were to share a site but to use individual antennas, it would be necessary to use a base-station mast supporting five antennas at different heights: this in turn requires increased mast height as compared to that for a single antenna, and a stronger mast structure to operate in high winds. Mast costs therefore increase. Moreover, sites which can accommodate a larger mast are difficult to obtain: there are planning permission or zoning problems and large masts are environmentally obtrusive and unsightly.

Many operators of cellular mobile radio networks employ their own base-stations with associated masts and antennas. There is little sharing of sites, and any sharing that does take place is limited to sharing of the mast only and not antennas as well.

The introduction of the third generation (3G) cellular mobile radio system will demand an increased number of base-station sites: there will be difficulties in acquiring the necessary real estate and site sharing will be an increasingly attractive option if the technical problems can be overcome.

The general concept of site sharing is disclosed by Suzanne Smith at www.twsinternational.com/papers/Nov98SiteSharing.pdf in "Site Sharing For Cost Minimisation", TWS Inc. (November 1998). The use of multiple antennas in a common antenna structure is disclosed by B L. Wixon in "Tunable CDMA Combiners Add Cellular/PCS Capacity", K&L Mictowave Inc. (September 1997), www.klmicrowave.com.news/mrf_sept97.html. In "Suggested VHF/UHF Trunking Configurations", www.sinctech-.com, (22 Oct. 2001) Sinclair Technologies Ltd discloses the use of isolators in a transmitter combiner. UK Pat Appln No 2,006,579 A (Watanabe et. al.), PCT Appln No WO 97/44914 (Gammon) and PCT Appln No WO 92/12579 (Prokkola) all disclose combining signals from different transmitters for transmission from an antenna system.

U.S. Pat. No. 4,211,894 (Watanabe) discloses combining signals in different frequency bands using hybrid couplers. Interference is said to be avoided by feeding signals from the couplers to four different antenna surfaces arranged at 90 degree intervals.

U.S. Pat. No. 5,229,729 (Nishikawa et al) discloses combining signals in contiguous frequency bands. The signals are separated into two groups of non-contiguous frequency bands and filtered in dielectric resonators. Each signal in a group is then combined with other signals in that group in a junction unit. The two resulting combined signals are themselves combined with one another in a 3 db hybrid circuit with a dummy load or circulators with dummy loads giving 50% power loss in each case. Cooling fans are used to suppress temperature rise in the dielectric resonators and heat generation in the dummy load(s).

It is an object of the invention to provide an alternative means for allowing multiple use of a base station.

The present invention provides a transmit network for cellular mobile radio operating over a plurality of contiguous frequency bands, the network incorporating a plurality of transmitters associated with respective band-pass filters for filtering transmitter output signals arranged in a plurality of groups of output signals, at least one group containing a plurality of such signals spaced apart in frequency such that interference between output signals in adjacent frequency bands is inhibited, characterised in that the network includes an antenna system having a plurality of antenna elements, and the network is arranged to feed the groups of output signals to respective antenna elements.

The invention provides the advantage that it overcomes the technical problem of combining a plurality of transmitter output signals in an acceptable fashion.

The output signal groups may be two groups of two and three output signals respectively. The antenna system may have mutually orthogonally polarised radiating elements arranged to receive respective output signal groups for transmission. The network may include respective isolators between the transmitters and their associated band-pass filters, the isolators being arranged to inhibit output signals passing between transmitters.

In an alternative aspect, the present invention provides a transmit network for cellular mobile radio operating over a plurality of contiguous frequency bands, the network incorporating a plurality of transmitters, characterised in that the transmitters are associated with respective band-pass filters, the network is arranged to combine output signals from the transmitters after filtration in the band-pass filters without using a 50% power loss combiner, and the network is also arranged to reduce interference between output signals in adjacent frequency bands.

The network may be arranged to reduce interference between output signals by providing unused frequencies acting as guard bands between adjacent frequency bands. It may be arranged to reduce interference between output signals by providing for separate filtration of transmit signals at adjacent frequencies and for a degree of isolation therebetween.

In a further aspect, the present invention provides a method of transmitting signals in a cellular mobile radio system operating over a plurality of contiguous frequency bands, the method including:

a) dividing output signals from a plurality of transmitters in respective frequency bands into a plurality of groups, at least one group containing a plurality of output signals spaced apart in frequency, b) filtering each output signal in a respective band-pass filter in such a way that interference between output signals in adjacent frequency bands is inhibited, characterised in that the method also includes:

c) feeding the filtered output signal groups to respective antenna elements of an antenna system.

The method may include combining output signals from the transmitters by multiplexing together output signals of a group before combining signal groups. The output signal groups may be two groups of two and three output signals respectively. The antenna system may have mutually orthogonally polarised radiating elements arranged to receive respective output signal groups for transmission. The method may include providing respective isolators between the transmitters and their associated band-pass filters, the isolators being arranged to inhibit output signals passing between transmitters.

In an alternative further aspect, the present invention provides a method of transmitting signals in a cellular mobile radio system operating over a plurality of contiguous frequency bands, the method including using a plurality of transmitters transmitting output signals in respective frequency bands, characterised in that each output signal is filtered in a respective band-pass filter and is subsequently combined with the other filtered output signals without use of a 50% power loss coupling device and in such a way as to reduce interference between output signals in adjacent frequency bands.

The method may be arranged to reduce interference between output signals by providing unused frequencies acting as guard bands between adjacent frequency bands. Interference between output signals may be reduced by providing for separate filtration of output signals at adjacent frequencies and for a degree of isolation therebetween.

In order that the invention might be more fully understood, embodiments thereof will now be described, by way of example only, with reference to the accompanying drawings, in which:

FIG. 3 illustrates prior art third generation frequency division duplex base station frequency allocation;

Figure 5:
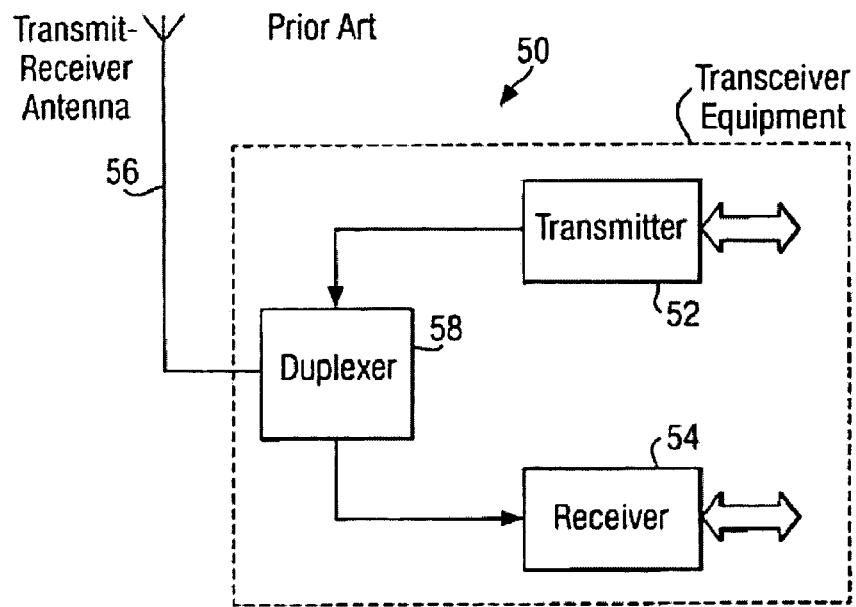
Figure 6:
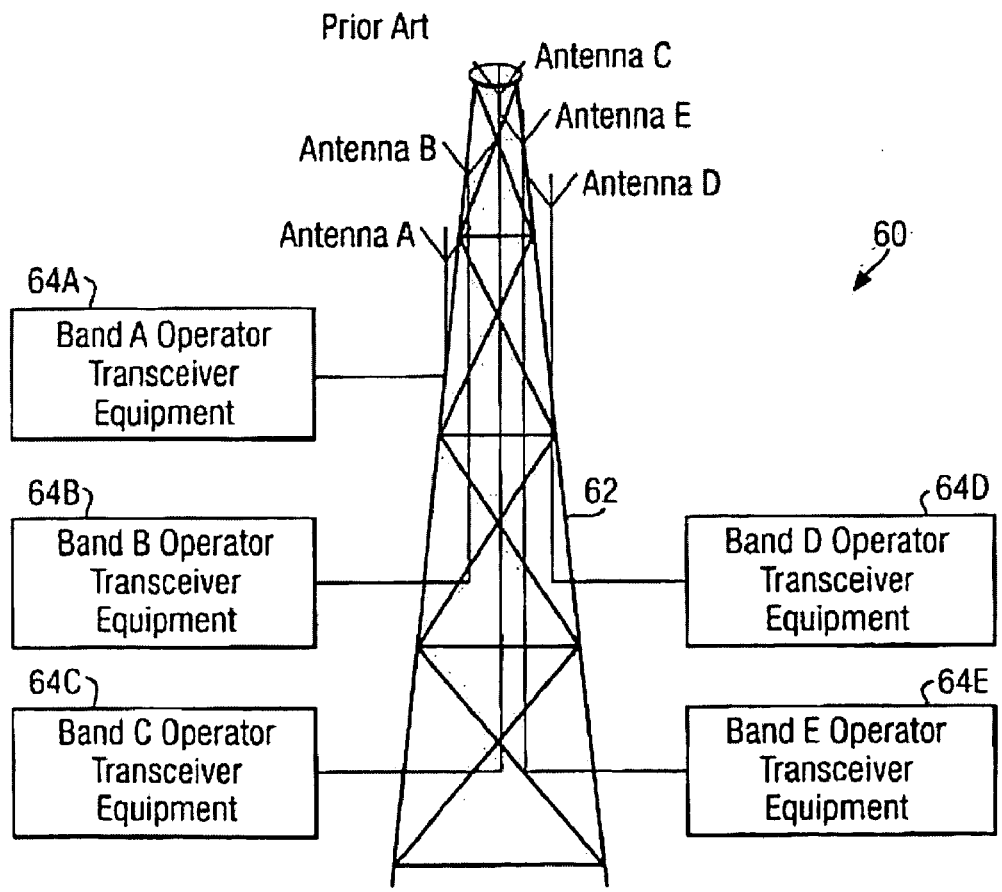
Figure 7:
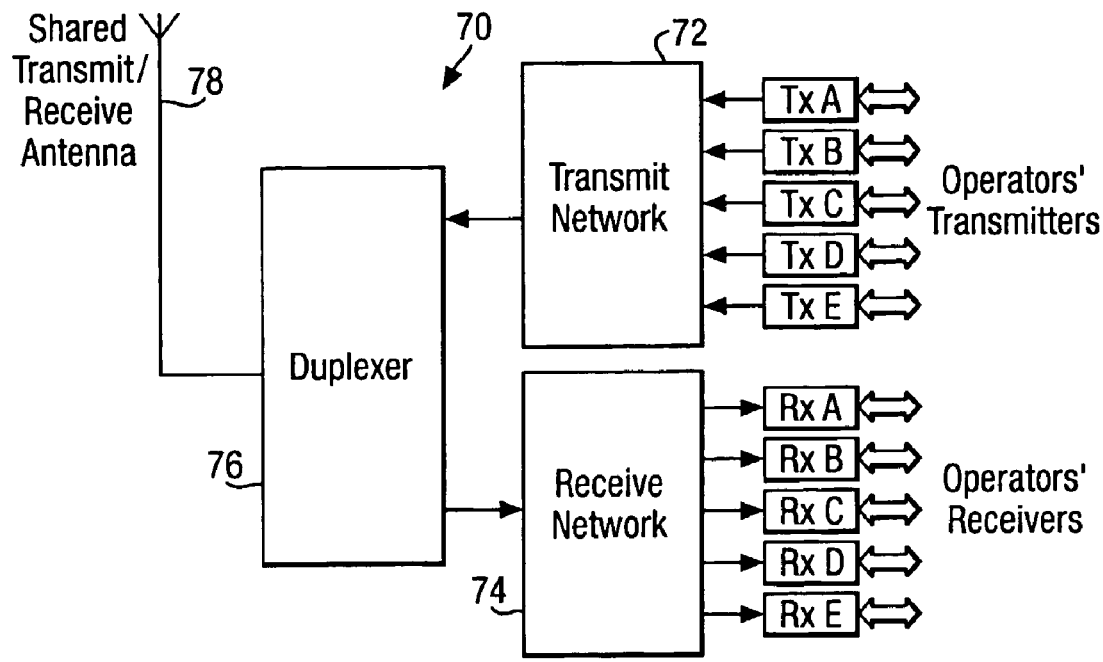
Figure 8:
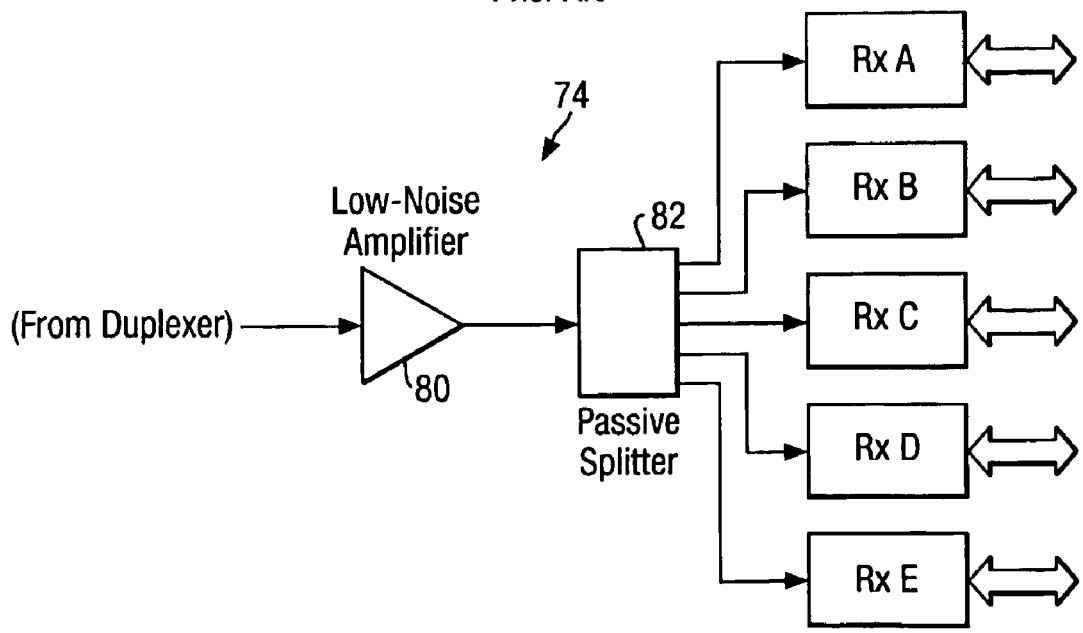
Figure 9:
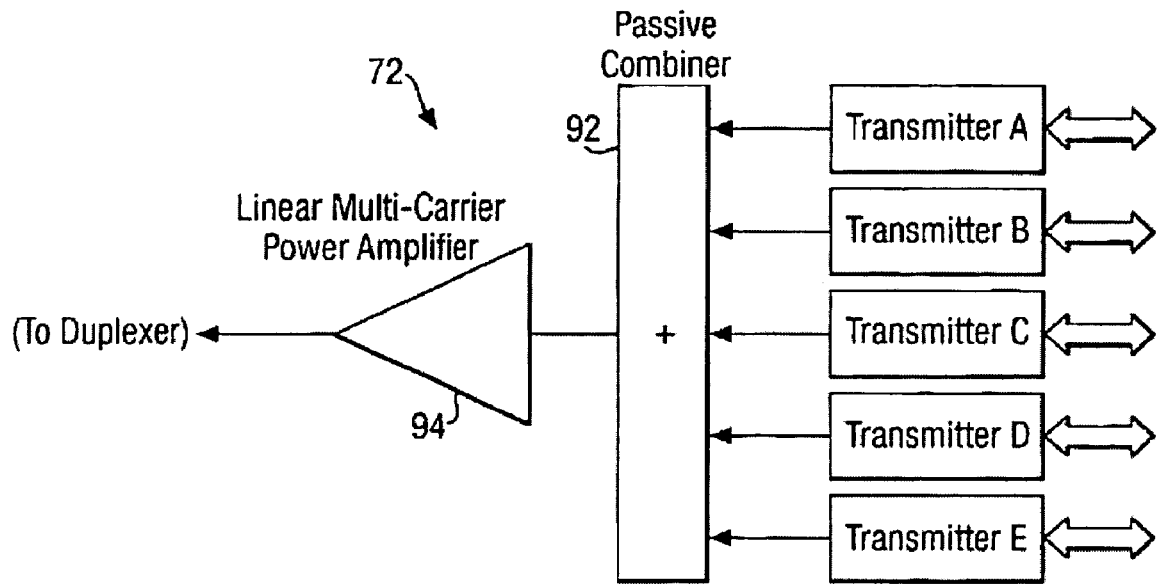
Figure 10:
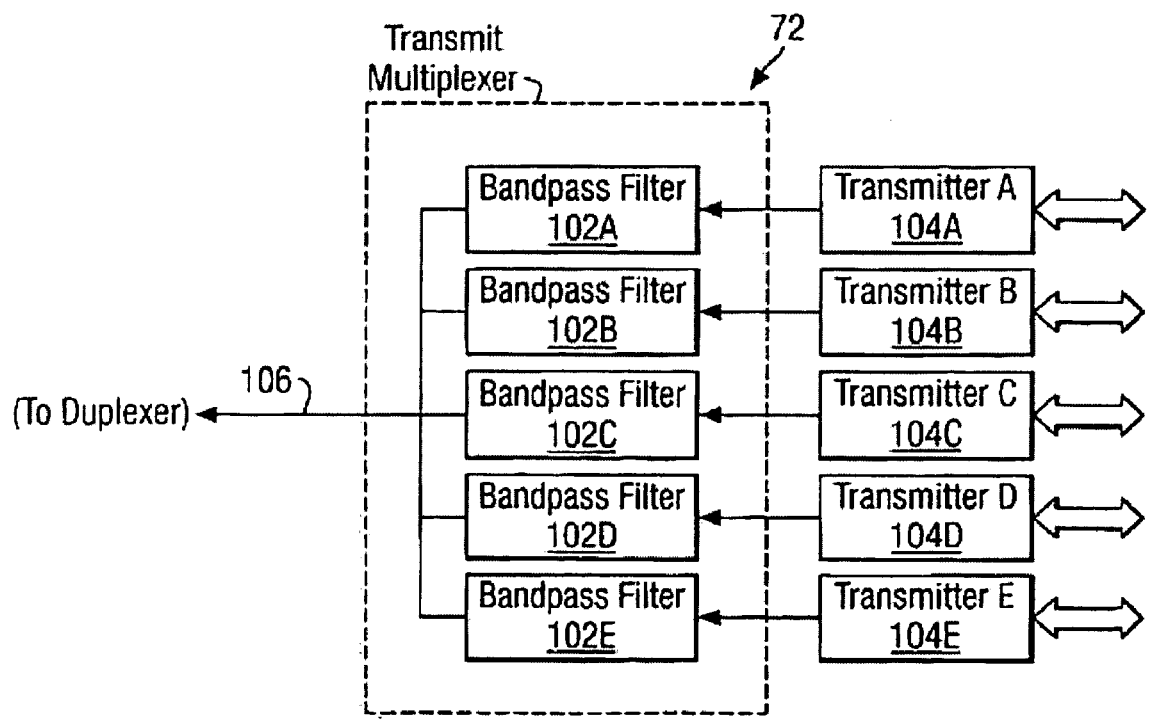
Figure 11:
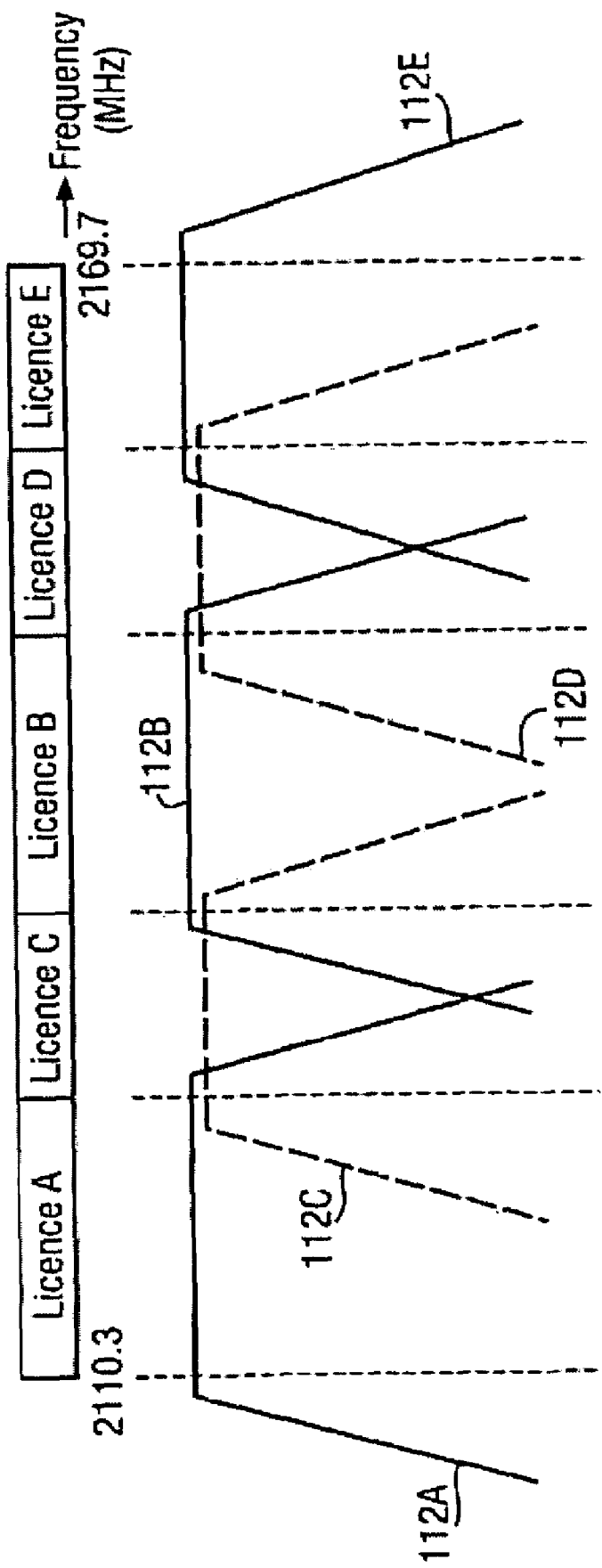
Figure 12:
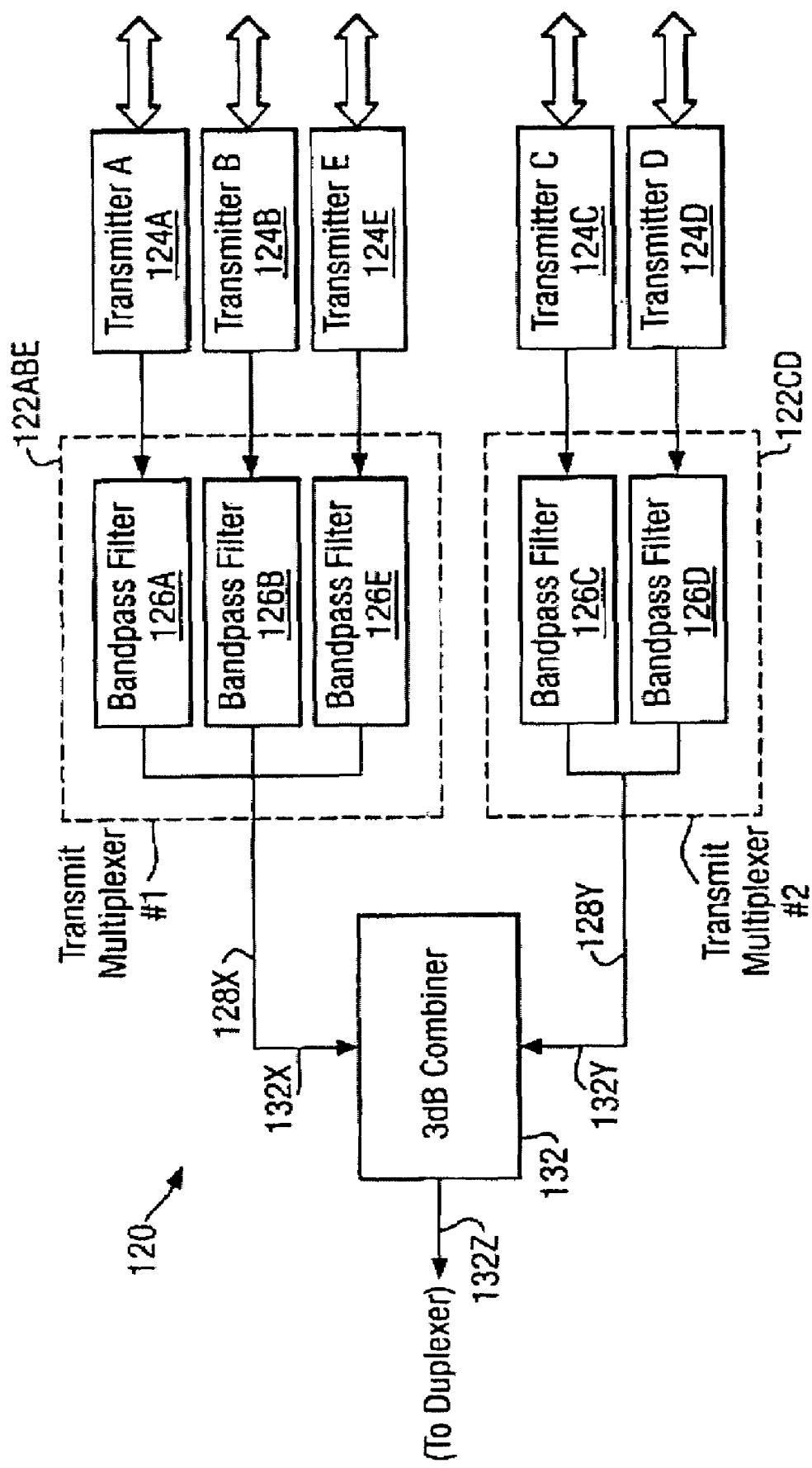
Figure 13:
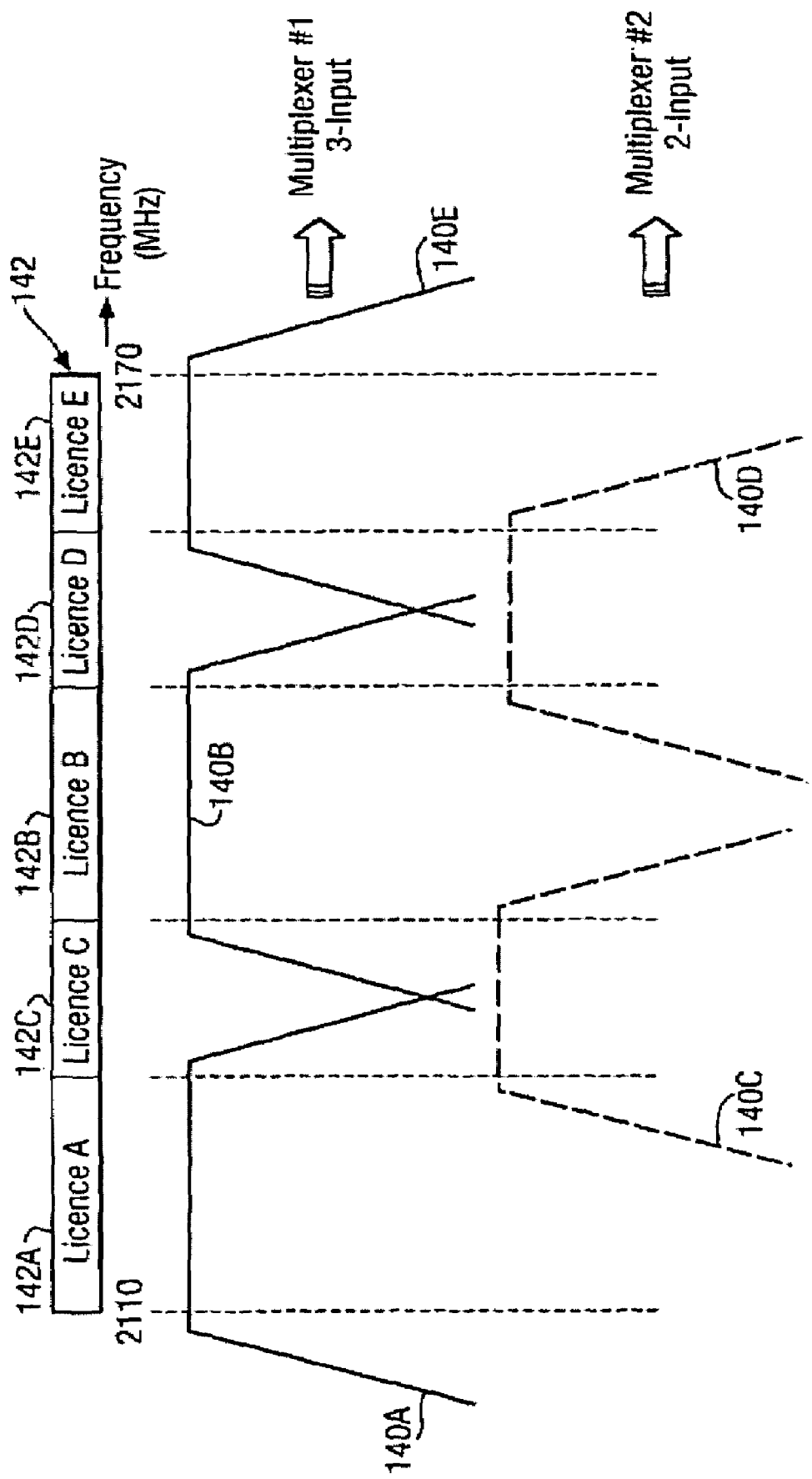
Figure 14:
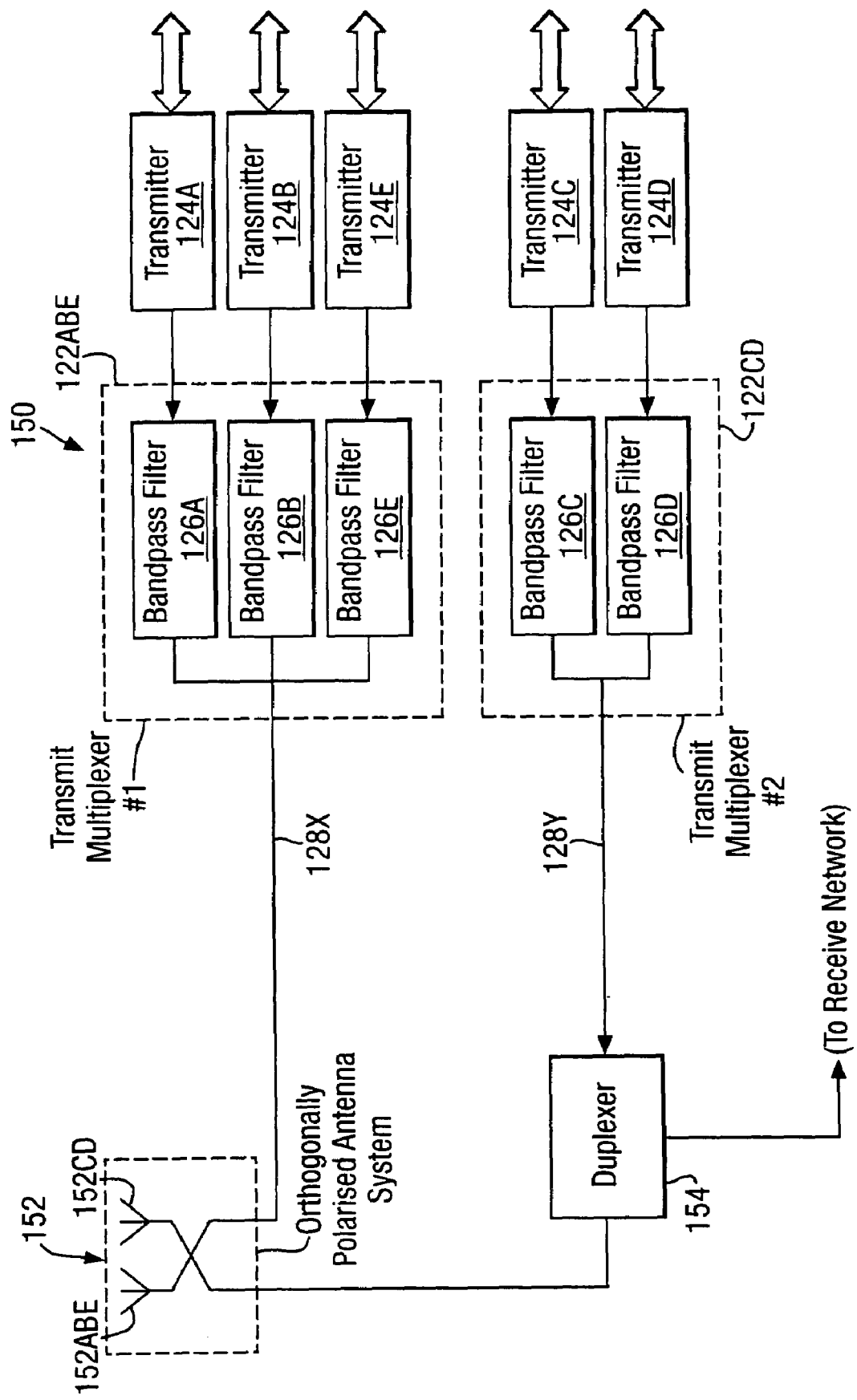

FIG. 4 schematically shows a prior art base station arrangement using separate transmit and receive antennas;

FIG. 5 schematically shows a prior art base station arrangement using a common transmit/receive antenna;

FIG. 6 illustrates prior art base-station mast sharing;

FIG. 7 illustrates a prior art network for sharing of a transmit/receive antenna;

FIG. 8 shows a prior art receive network for use in the FIG. 7 network;

FIG. 9 illustrates a transmit network for use in the FIG. 7 network with multi-carrier power amplifier;

FIG. 10 illustrates a transmit network for use in the FIG. 7 network using multiplexer filters;

FIG. 11 shows the frequency responses of the multiplexer filters of FIG. 10;

FIG. 12 is a schematic drawing of a further transmit network;

FIG. 13 shows frequency responses of the multiplexer filters of FIG. 12;

FIG. 14 illustrates use of orthogonally-polarised antenna elements in a variant of the FIG. 12 network.

Figure 15:
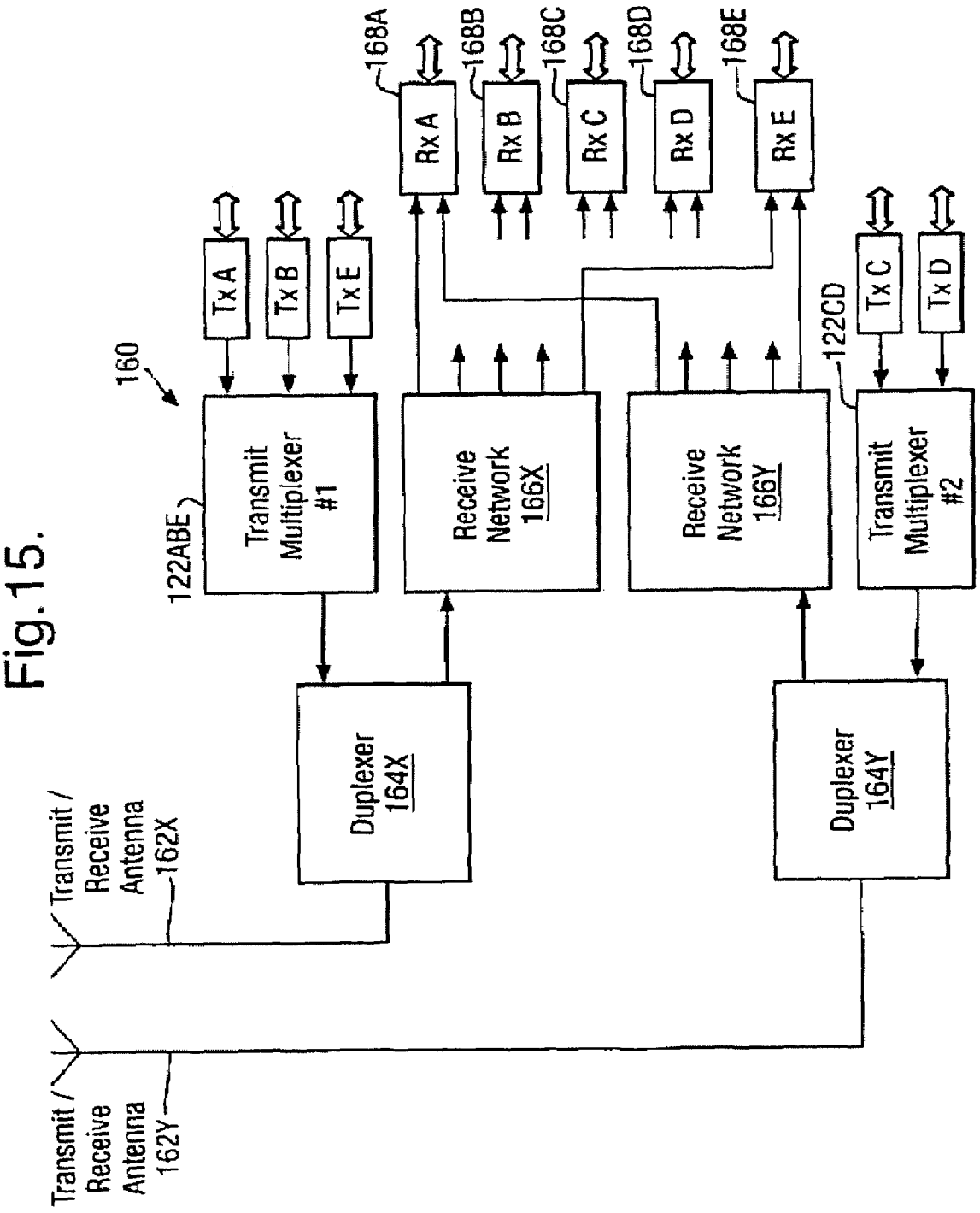
Figure 16:
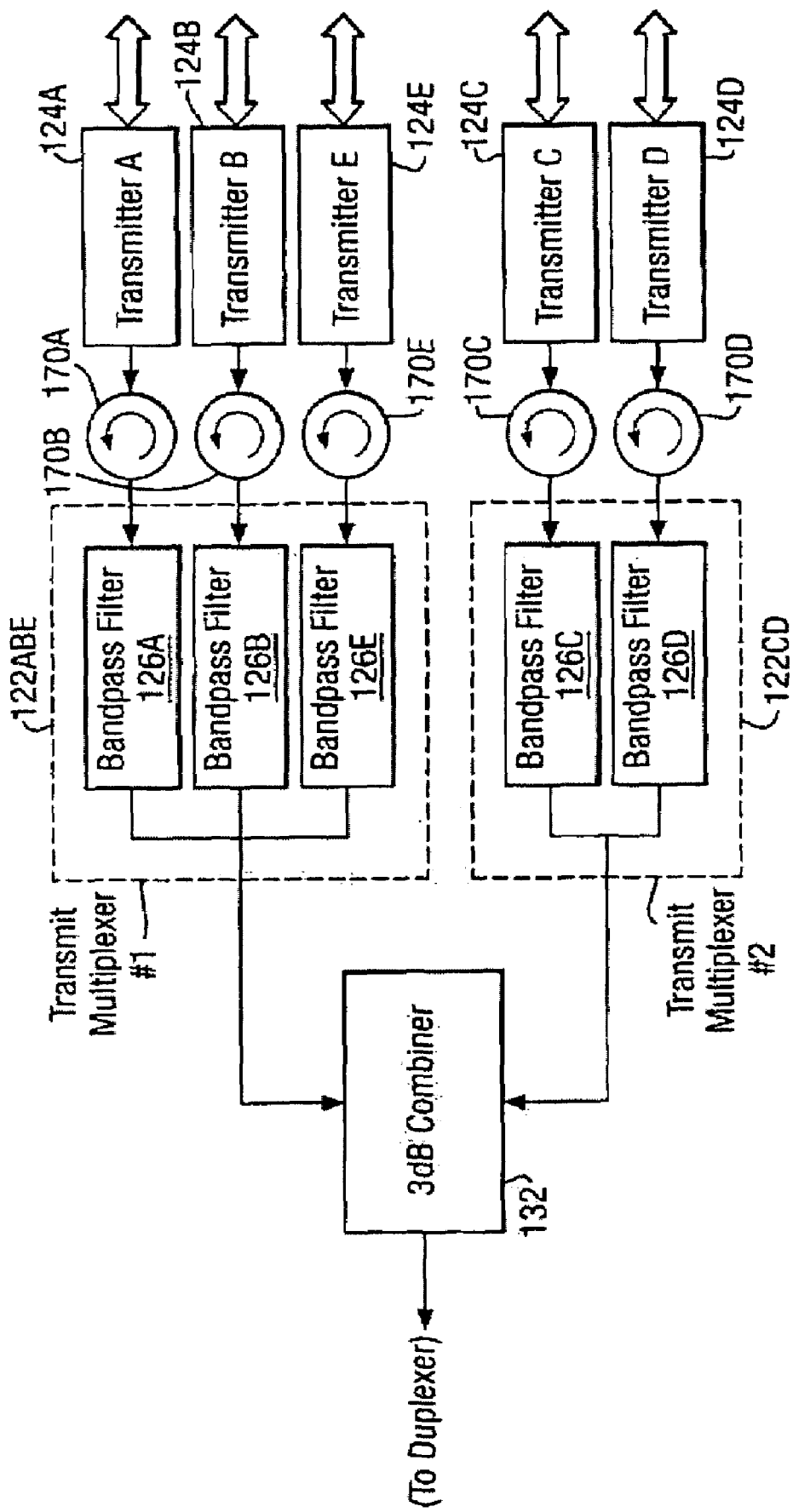
Figure 17:
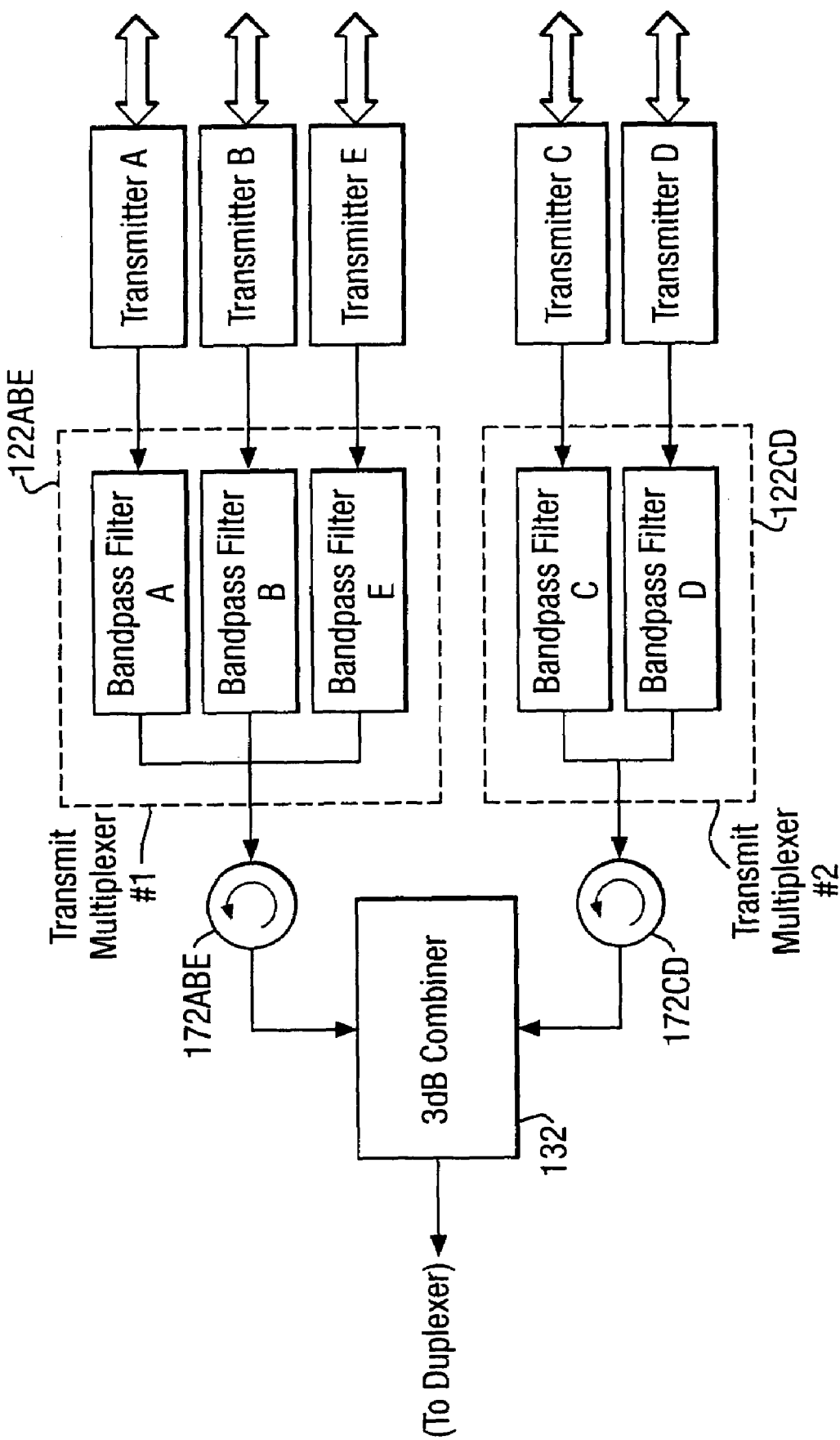
Figure 18:
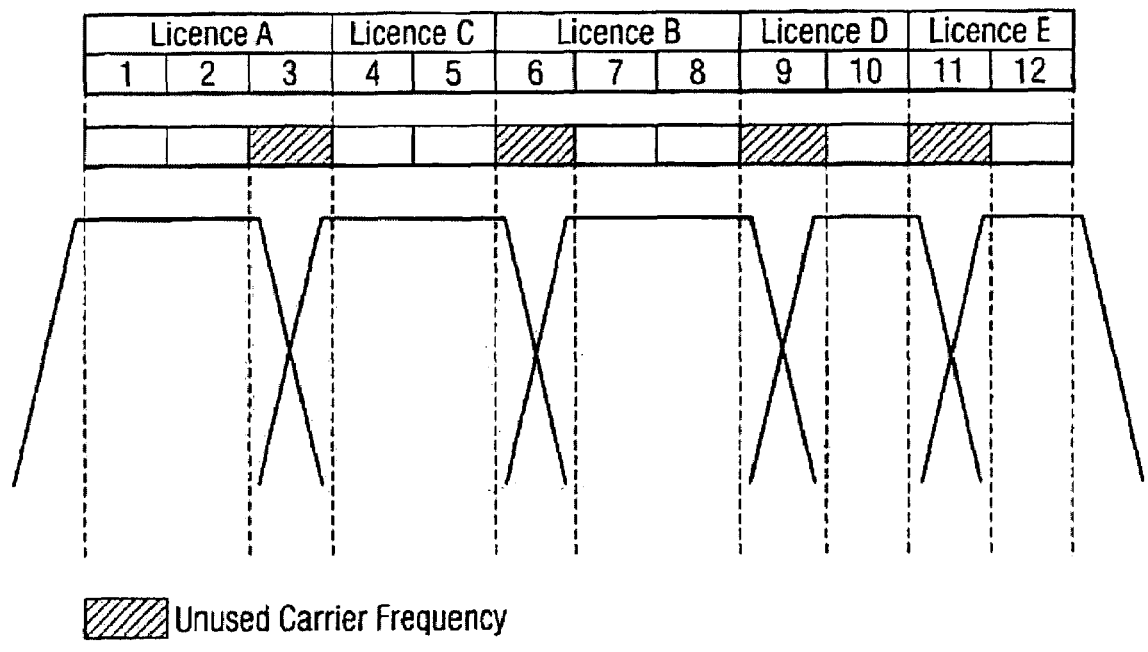
Figure 19:
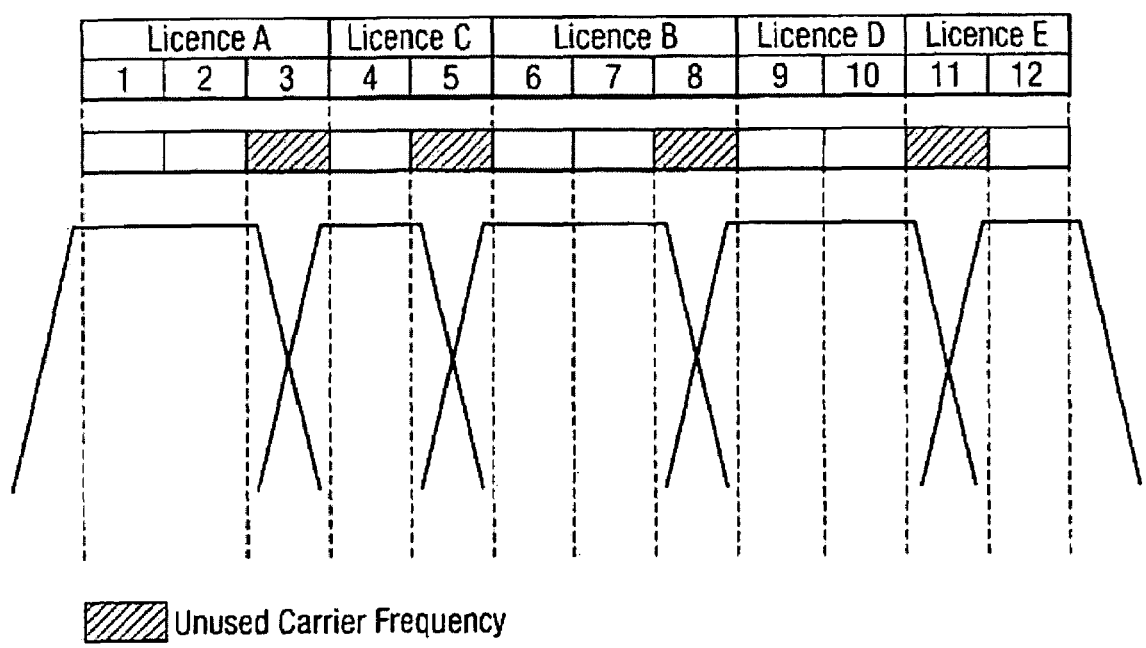

FIG. 15 illustrates modification of the FIG. 12 network to give spatial receive diversity;

FIGS. 16 and 17 illustrate provision of signal isolation between transmitters; and FIGS. 18 and 19 illustrate provision of unused carrier frequencies as guard bands to separate adjacent transmit frequencies.

Figure 1:
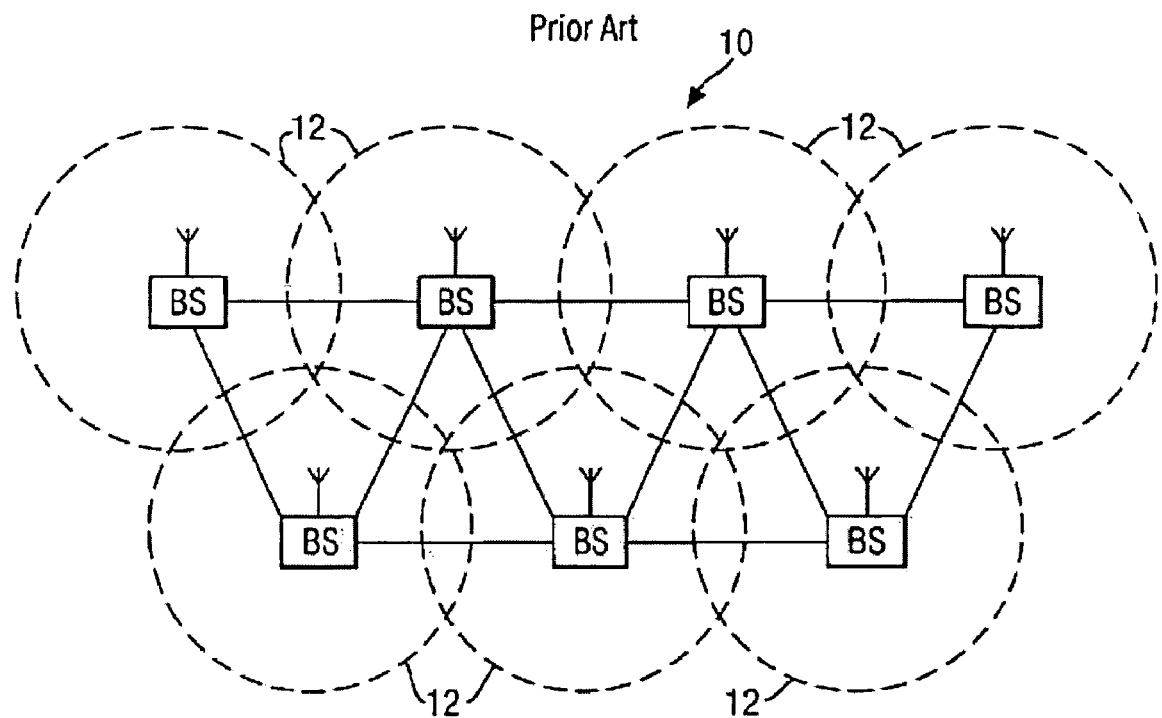
FIG. 1 illustrates a prior art architecture for a third generation cellular mobile radio network.

Referring to FIG. 1, a cellular mobile radio network indicated generally by 10 is defined by an array of individual base-stations BS each of which communicates with mobile radios (not shown) in a respective circular region (shown in chain form) of cell 12. The cells 12 overlap. The base-stations BS are linked to one another by connections 14. The network 10 allows mobile radios throughout the area of the cells 12 in combination to communicate with one another, as well as with the public telephone system outside this area.

Figure 2:
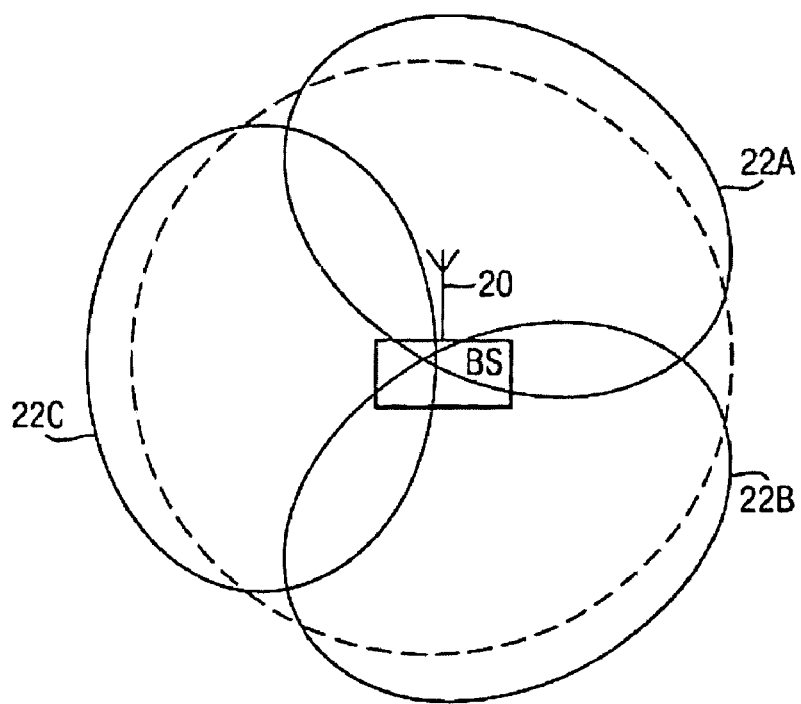
FIG. 2 is a schematic drawing of the coverage of prior art base station for the FIG. 1 network having sectored antennas of 120°.

Referring now also to FIG. 2, each base-station has an antenna structure 20 to communicate with mobile radios: as illustrated the antenna structure 20 provides overlapping coverage 22A, 22B and 22C for three sectors of 120° to obtain a full 360° horizontal coverage. It is composed of three separate antennas (not shown), each with a beamwidth of 120° and providing coverage over a limited part of the cell.

FIG. 3 shows the Third Generation Frequency Division Duplex (3G FDD) frequency bands allocated by the United Kingdom (UK) Radiocommunications Agency for use by UK network operators. Each of five UK operators is licensed to use a specific part or sub-band of the allocated spectrum labelled Licence A, B, C, D or E, for transmission to the mobile radio from the base-station and another such part for transmission to the base-station from the mobile. For all five in combination, the total spectrum allocation consists of a band 2110.3 MHz to 2169.7 MHz for FDD transmission from base-stations, and a band 1920.3 MHz to 1979.7 MHz for transmission from mobile radios. Although there are unallocated frequency intervals or guard bands (not shown) at the edges of both these bands, there are no gaps between the individual operators' sub-bands A, B C, D and E. As will be described later in more detail, this gives rise to a problem if it is required to use a common antenna for all operators.

A common prior art base-station architecture indicated generally by 40 is shown in FIG. 4. It has two separate antennas 42 and 44 for transmission and reception with associated transmitter and receiver circuits 46 and 48 respectively. An alternative prior art architecture 50 is shown in FIG. 5, where a single operator's transmitter and receiver circuits 52 and 54 are connected to a base station antenna 56 through a duplexer 58, which allows simultaneous transmit and receive through the antenna. A base-station might be configured as a number of discrete sectors, each with respective architectures 40 and 50.

The architectures 40 and 50 are satisfactory when each network operator has a respective base-station site, which is becoming increasingly difficult to provide. FIG. 6 shows a common prior art architecture 60 for sharing base-stations: it is suitable for five network operators sharing a site with a respective transmit/receive antenna for each. The result is a total of five antennas A, B, C, D and E attached to a base-station mast 62, with each antenna at a different height. The antennas A to E have respective transceiver circuitry 64A to 64E. Compared to that used for a single antenna, mast height has to be increased to accommodate five antennas. In addition, the increased height means, that the mast structure has to be strengthened to maintain operation in high winds, which increases costs. Moreover, not all sites are able to accommodate a larger mast, and difficulties are often experienced in obtaining planning permission from local authorities. Large masts covered with antennas are unsightly and obtrusive, and may be environmentally unacceptable at some sites.

FIG. 7 shows a conceptual prior art architecture 70 suitable for reducing the number of transmit/receive antennas required from five to one. Five operators have respective transmitters TxA to TxE connected to a transmit combiner network 72 and receivers RxA to RxE connected to a receive splitter network 74. The networks 72 and 74 are connected via a duplexer 76 to a shared antenna 78. The transmitters TxA to TxE generate RP signals which are combined in the transmit combiner network 72 and pass through the duplexer 76 to the antenna 78. Signals received by the antenna 78 from remote mobile radios (not shown) are fed from the antenna through the duplexer 76 to the receive splitter network 74, which shares the signals equally between the five receivers RxA to RxE.

Referring now also to FIG. 8, in a simple form the receive splitter network 74 may include a low-noise amplifier 80 and a passive signal splitter 82.

The architecture 70 requires a practical implementation of the transmit combiner network 72: this will now be discussed with reference to FIGS. 9 and 10, which illustrate two alternative attempts to solve the problem. They show networks that might be considered viable but which in fact have drawbacks.

FIG. 9 shows a possible form of transmit combiner network 72 which includes a passive network 92 to combines the five transmitters A to E: unfortunately the passive network 92 introduces significant signal loss which reduces transmission range unacceptably. To remedy the loss the transmit combiner network 72 incorporates an RF linear multi-carrier power amplifier 94 to increase signal power to a level appropriate for acceptable communication with remote mobile radios. The drawback of the transmit combiner network 72 shown in FIG. 9 is the need for the power amplifier 94 capable of providing the requisite output RF power in all five transmission frequency bands with adequate linearity, instantaneous bandwidth and efficiency. Such amplifiers, even if technically realisable, would be expensive. In addition, since the amplifier has to handle considerably more RF power than that from a single transmitter, it is liable to prove less reliable than a lower power equivalent, and so represents a potential single-point failure in the architecture 70. To avoid protracted absences of communication facilities due to failure of the amplifier 94, it would be necessary to incorporate a "hot standby" amplifier, which increases costs.

FIG. 10 shows an alternative possible signal combining architecture for the transmit combiner network 72. This network 72 has an assembly of five band-pass filters 102A to 102E acting as a transmit multiplexer and indicated collectively by 102. The filters 102A to 102E filter the signals from respective transmitters 104A to 104E, after which the signals are multiplexed on to a common output line 106 and routed to the duplexer 76 and antenna 78 shown in FIG. 7. The pass-band of each filter 102A to 102E is as nearly as possible the frequency band licensed to the respective operator. The potential benefit of this network 72 is that it typically exhibits a lower signal loss than the passive network 92 shown in FIG. 9.

However, the filters 102A to 102E can never be perfect, i.e. they cannot have pass-bands with accurately located, infinitely sharp cut-on and cut-off. FIG. 11 shows pass-bands 112A to 112E of the filters 102A to 102E for the licensed transmit frequency band of 2110.3 MHz to 2169.7 MHz of FIG. 3. The filters 102A to 102E nominally provide equal peak transmitted power, but for clarity pass-bands 112C and 112D have been moved down relative to pass-bands 112A, 112B and 112E. It can be seen that adjacent pairs of pass-bands such as 112A and 112C overlap seriously because of finite slope of cut-on and cut-off: this gives rise to two deleterious effects, increased signal loss in the overlap region and reduced isolation between transmitters 104A to 104E.

The reason for the increased signal loss and reduced transmitter isolation is associated with the common output line 106 to which the filters 102A to 102E are connected. In order to combine the signals 102A to 102E efficiently at the output line 106, the electrical impedance across each filter pass-band 112A to 112E must be maintained at some nominal value, e.g. 50 ohms. If the pass-bands 112A to 112E overlap, however, as shown in FIG. 11, this nominal impedance cannot be maintained: this results in (a) loss in signal coupling to the output line 106 and distortion of the transmitted waveform, (b) a proportion of each signal coupling into adjacent filters and hence into other transmitters 104A to 104E. Coupling of a signal into the output of a transmitter results in inter-modulation products being generated in the transmitter output stage which is non-linear. These products become uncontrolled spurious emissions which, if large enough, can exceed the level permitted by the regulatory authorities which oversee communications of this kind. The combining concept illustrated in FIG. 10 therefore relies on idealised multiplexer filters 102A to 102E with rectangular frequency response between pass-band and stop-bands: because in practice this is unrealisable, there will be overlap which gives rise to interference between bands, reduction in available bandwidth and power loss.

Consequently, there is a need for an acceptable method for combining the output of several transmitters operating in a contiguous frequency transmit band to allow network operators to share a single transmit/receive antenna. However, as a result of the difficulties described above, among those of ordinary skill in the art it is believed that there is currently no satisfactory way of achieving this having regard to costs, complexity, degraded performance and unreliability.

Referring now to FIG. 12, there is shown a further transmitter network 120. The network 120 incorporates first and second transmit multiplexers 122ABE and 122CD: the first transmit multiplexer 122ABE receives transmission signals from three transmitters 124A, 124B and 124E, and filters them in respective band-pass filters 126A, 126B and 126E; the second transmit multiplexer 122CD receives transmission signals from two further transmitters 124C and 124D, and filters them in respective band-pass filters 126C and 126D.

Filtered output signals from the band-pass filters 126A, 126B and 126B are combined at a first filter output 128X and those from band-pass filters 126C and 126D are combined at a second filter output 128Y. Signals from the filter outputs 128X and 128Y are combined in a two-input 3 dB passive combiner 132 with two input ports 132X and 132Y and an output port 132Z: they are then fed as shown in FIG. 7 via a duplexer to a transmit/receive antenna (not shown).

Referring now also to FIG. 13, the respective pass-bands 140A to 140E of the five filters 126A to 126E are as shown. The pass-bands 140A to 140E have the same nominal maximum, albeit their bandwidths are not all equal and pass-bands 140C and 140D are shown moved down relative to the others for clarity. As shown on a frequency scale 142, five licensed frequency bands 142A to 142E comprise frequency band 142C immediately adjacent frequency bands 142A and 142B, and frequency band 142D immediately adjacent frequency bands 142B and 142E. This results in two groups of non-adjacent frequency pass-bands 142A/142B/142E and 142C/142D, which, as shown in FIG. 12, are associated with different transmit multiplexers 122ABE and 122CD respectively.

Because the filter pass-bands in each transmit multiplexer 122ABE or 122CD are separated by stop-bands which preclude significant pass-band overlap, output from filter 126A for example at 128X will only reach transmitters 124B and 124E via filters 126B and 126E in highly attenuated form and will be negligible for most purposes. Similar remarks apply to coupling between other pairs of transmitters within an individual transmit multiplexer 122ABE or 122CD and therefore to filters 126A to 126E. The attenuation provided by the filters 126A to 126E isolates transmitters from other signals at the outputs 128X or 128Y as appropriate, and consequently at these outputs the signals are "perfectly combined". The expression "perfectly combined" means that, because the passbands of the respective filters 126A etc do not overlap, the electrical impedance of multiplexers 122ABE and 122CD over the filter passbands remains substantially constant, unlike the equivalent for the filters 102A to 102E shown in FIG. 10. This allows input signals from transmitters 124A to 124E to pass through a multiplexer 122ABE or 122CD to an output 128X or 128Y with minimal distortion ("perfect") so performing the desired combining function. When the filter pass-bands overlap, as illustrated in FIG. 11, pass-band impedance is not constant, hence signals appearing at a multiplexer output are distorted ("imperfect").

To combine the two signal groups at the outputs 128X and 128Y while inhibiting undesirable interactions between transmitters 124A to 124E, the combiner 132 is used: this combiner is a two-input 3 dB passive wideband component and it provides good signal isolation of at least 20 dB between its two input ports 132X and 132Y irrespective of the frequency separation of signals at these ports. It allows signals which are adjacent in frequency to be combined without allowing appreciable unwanted transmitter coupling between them. Hence, signal groups at 128X and 128Y are combined in a linear fashion, without an unacceptable degree of mutual interaction, and appear at the output of combiner 132 as a substantially perfectly combined continuous frequency spectrum.

Although there is an inherent signal loss between the input and output ports 132X to 132Z of combiner 132, this is significantly less than the loss imposed by passive five-input combiner 92 shown in FIG. 9. The two-stage combining approach described with reference to FIG. 12 provides a more efficient passive transmitter combining network than architectures described earlier, and avoids the need for a linear multi-carrier power amplifier 94.

The network 120 therefore allows operators in both adjacent and non-adjacent transmit bands to share a base-station antenna. Expensive multi-frequency power amplifiers are not necessary, because the transmitter combining network 120 has reduced losses compared to that shown in FIG. 9. In addition, the invention avoids the overlapping filter pass-bands described with reference to FIGS. 10 and 11.

The minimum number of transmit signals which could be used in an arrangement akin to the network 120 is two signals connected via respective separate filters to the 3 dB passive combiner 132. If there are only two transmitters in adjacent frequency bands there is no need to multiplex transmit signals together in a multiplexer such as 122CD before feeding to the combiner 132. If there are two signals which are non-adjacent in frequency, they can be combined using one multiplexer 122 and fed directly to a duplexer without passing through a combiner such as 132, thus reducing signal loss. With three transmit signals, where at least two are in adjacent bands, two would be combined in multiplexer 122 and the third would be fed directly to combiner 132. If, however, the three non-adjacent frequencies bands A, B and E were to be combined, only one multiplexer 122ABE would be required and its output 128X would be fed directly to the duplexer, without passing through combiner 132. Four or more signals requires at least two groups of two or more non-adjacent signals, each group to be multiplexed together before combining with the other group. More than two groups could of course be employed with four or more signals if desired for example to reduce the number of signals per group or increase the frequency separation between signals in each group. When combining fewer than five transmitters, any unused inputs to multiplexers 122 would normally be terminated in a load. Alternatively, unused frequency filters 126 could be omitted: this would reduce cost, size and weight.

Referring now to FIG. 14, there is shown a transmit system 150 which is a variant of the architectures described with reference to FIGS. 7 and 12. Elements equivalent to those previously described are like referenced. The system 150 differs from the network 120 in that the first and second transmit multiplexers 122ABE and 122CD are not connected to a common 3 dB combiner: instead the first transmit multiplexer 122ABE is connected directly to one radiating element 152ABE of an antenna unit 152 containing two orthogonally-polarised radiating elements; the second transmit multiplexer 122CD is connected to a second such radiating element 152CD via a duplexer 154, which also feeds signals received by the antenna 152CD to a receive network (not shown). The antenna unit 152 is of the kind available from Thales Antennas or Alan Dick and Company Ltd.

As before the system 150 exploits the ability of the multiplexers 122ABE and 122CD to combine non-adjacent frequency bands: rather than combining the multiplexer outputs in a passive combiner, the system 150 combines them in a single antenna unit 152 with orthogonally-polarised radiating elements. The primary advantage of this arrangement is that the radio frequency (RF) losses in transmission are even less than those incurred by the network 120: losses are reduced because there is now no combiner 132, which would impose a signal loss of around 3 dB. The combining function is now provided by the two-input antenna 152, which provides isolation of 20 dB or more between two signals input to different antenna elements 152ABE and 152CD.

The invention may be adapted for spatial and polarisation diversity (both transmit and receive). FIG. 15 illustrates a network 160 of the invention incorporating spatial receive diversity. Elements equivalent to those described earlier are like referenced. The network 160 incorporates first and second antennas 162X and 162Y connected via duplexers 164X and 164Y to first and second transmit multiplexers 122ABE and 122CD respectively: the antennas 162X and 162Y are also connected to respective receive networks 166X and 166Y each providing an output at each of the five licensed frequencies. The receive networks 166X and 166Y therefore collectively provide a pair of outputs at each frequency, and each pair is summed in a respective receiver circuit 168A to 168E. The network 160 takes advantage of the availability of two antennas 162X and 162Y to avoid the need for a 3 dB combiner to combine signals from the transmit multiplexers 122ABE and 122CD, and this achieves a reduction in the RF losses in the path of transmission signals fed to the antenna.

Under some circumstances it will be advantageous to include additional isolators in a transmit network of the invention to provide signal isolation between individual transmitters: this is illustrated in FIGS. 16 and 17, which are equivalent to FIG. 12 with the addition of provision for additional isolation. Elements in FIGS. 16 and 17 equivalent to those previously described are like referenced. In FIG. 16, isolators 170A to 170E (collectively 170) are inserted between respective transmitter/filter combinations 124A/126A to 124E/126E. In FIG. 17, isolators 172ABE and 172CD (collectively 172) are inserted between the passive combiner 132 and respective transmit multiplexers 122ABE and 122CD. The isolators 170 and 172 avoid too high a level of reverse injection of signal power from one transmitter to another (e.g. transmitter 122A to transmitter 122B), which would result in intermodulation products that could cause unacceptable interference to receiver systems.

In the absence of isolators 170 and 172, signals from transmitters 124A etc might be coupled to some extent into output stages of other transmitters 124B etc. The absolute level of such reverse-coupled signals depends on the degree of isolation provided by the combiner 132 and the transmit multiplexers 122ABE and 122CD. For example, RF signals will "leak" from each input port of the combiner 132 to the other and then back through the transmit multiplexers 122ABE and 122CD to other transmitters. Although the combiner 132 and the transmit multiplexers 122ABE and 122CD do provide a degree of isolation which will be adequate for many purposes, this might not be acceptable in all circumstances, in which case isolators can be added to increase the total isolation between transmitters 124A etc.

The third generation cellular mobile radio system envisages five licences or operators but twelve carrier frequencies: i.e. licences A and B would each have three carrier frequencies and licences C, D and E would each have two carrier frequencies. The examples of the invention discussed above allow all twelve carrier frequencies in the 3G transmit band to be combined through one antenna. In some circumstances, however, base-stations may not need to support all twelve carrier frequencies. Even for sites shared by five operators, it might not be necessary to use all allocated carrier frequencies. Moreover, some base-stations may be shared by fewer than five operators. In these situations it is possible to exploit the fact that unused carrier frequency slots can then be used as filter guard bands, to avoid the drawback associated with overlapping filter responses described with reference to FIG. 11.

If filter guard bands are employed, it then becomes feasible to use the network 72 shown in FIG. 10, which would normally be considered non-viable. Two examples of implementing filter guard bands are shown in FIGS. 18 and 19. In both these drawings, licences A, B, C, D and E have respective carrier frequency numbers 1/2/3, 4/5, 6/7/8, 9/10 and 11/12. In FIG. 18, carrier frequencies with numbers 3, 6, 9 and 11 are left unused providing respective guard bands between each adjacent pair of licences A/C, C/B, B/D and D/E. A similar situation applies in FIG. 19, where carrier frequencies with numbers 3, 5, 8 and 11 are left unused, and other arrangements are obviously possible. The advantage of this arrangement is that the transmitter outputs from a number of adjacent operators can be combined directly with minimal signal loss.

The number of carrier frequencies passing through any one filter (eg 126A) depends on which frequency scheme is used. Two examples of frequency plans are shown in FIGS. 18 and 19, but others are possible. Hence a transmitter/filter pair could be associated with one, two or three carriers, depending on configuration. For example, an operator having licence A with three carrier frequency numbers 1/2/3 could have all three passing through one filter, as long as carrier frequency number 4 (the first carrier frequency of licence C) was designated a guard band.

The examples of the invention described above can be constructed using existing commercially available technology. The components required to put these examples into practice are a multiplexing filter, a passive two-input combiner, isolators, a duplexer filter, a low-noise amplifier, a passive five-way splitter and an orthogonally-polarised antenna system.

A multiplexing filter is available from a number of suppliers, including Filtronic, Remec and Aerial Facilities. In the example described with reference to FIGS. 12 and 13, a gap of 10 MHz is needed between non-adjacent frequency pass-bands such as 142A and 142B, which is achievable. The gap between filter pass-bands reduces to 5 MHz if guard bands are used as in FIGS. 18 and 19: filters with this characteristic are also realisable from the aforementioned suppliers.

The invention claimed is:

1. A transmit network for cellular mobile radio operating over a plurality of contiguous frequency bands, the network comprising:
    a plurality of transmitters for generating respective transmitter output signals in respective ones of said contiguous frequency bands;
    a plurality of band-pass filters, each filter associated with a respective one of said plurality of transmitters and having a respective pass band for filtering a respective transmitter output signals so as to pass a respective filtered transmitter output signal,
    an antenna system having a plurality of antenna elements, and
    means for combining the filtered transmitter output signals into a plurality of output signal groups, at least one of said output signal groups including a plurality of non-contiguous frequency bands from within said plurality of continuous frequency bands, and for feeding respective output signal groups to respective antenna elements.

2. A transmit network according to claim 1 wherein the plurality of output signal groups comprises two groups of two and three filtered transmitter output signals respectively.

3. A transmit network according to claim 1 wherein the antenna elements are mutually orthogonally polarised radiating elements arranged to receive respective output signal groups for transmission.

4. A transmit network according to claim 1 including respective isolators between the transmitters and their associated band-pass filters, the isolators being arranged to inhibit output signals passing between transmitters.

5. A method of transmitting signals in a cellular mobile radio system operating over a plurality of contiguous frequency bands from an antenna having a plurality of antenna elements, the method including the steps of:
generating transmitter output signals in respective ones of said contiguous frequency bands;
filtering each transmitter output signal so as to pass respective filtered transmitter output signals;
dividing said filtered transmitter output signals into a plurality of output signal groups at least one of said output signal groups contains a plurality of non-contiguous output signals spaced apart in frequency,
and
combining the output signal groups by feeding the respective output signal groups to respective antenna elements.

6. A method according to claim 5 wherein the dividing step includes dividing said plurality of output signal groups into two groups of two and three filtered transmitter output signals respectively.

7. A method according to claim 6 wherein the antenna elements are mutually orthogonally polarised antenna elements and said combining step feeds respective output signal groups for transmission on respective orthogonally polarized antenna elements.

8. A method according to claim 6 including the step of providing respective isolators between the transmitters and their associated band-pass filters, the isolators being arranged to inhibit output signals passing between transmitters.

* * * * *